Aug. 14, 1928.
S Q SHANNON ET AL
1,680,916
LIQUID LEVEL INDICATOR
Filed July 5, 1922
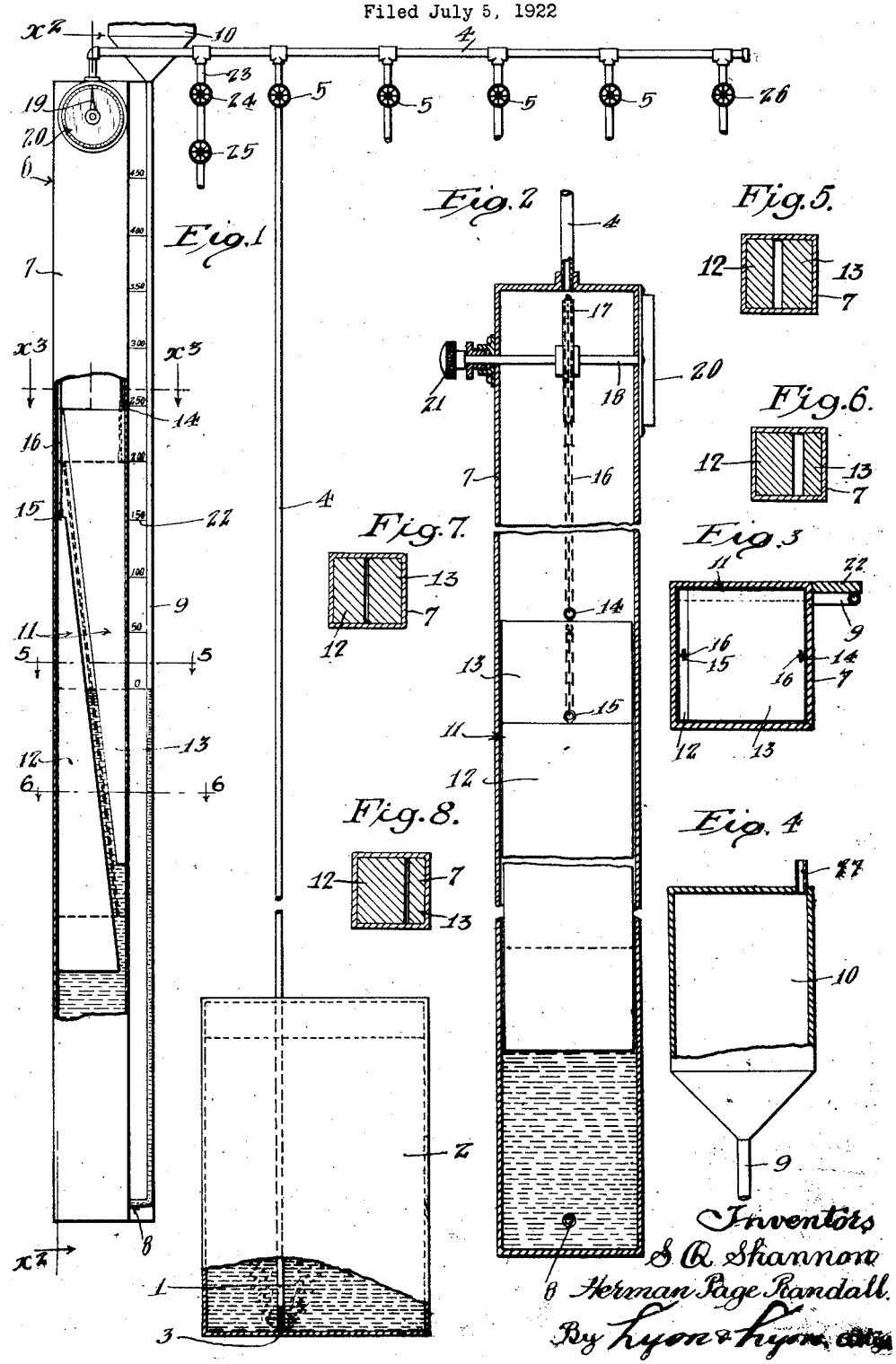
Inventors
S. Q. Shannon
& Herman Page Randall.
By Lyon & Lyon Patented Aug. 14, 1928.

1,680,916

UNITED STATES PATENT OFFICE.

S Q SHANNON AND HERMAN PAGE RANDALL, OF LOS ANGELES, CALIFORNIA.

LIQUID-LEVEL INDICATOR.

Application filed July 5, 1922. Serial No. 572,778.

Our invention relates to measuring the contents or height of the liquid in a container.

An important object of our invention is to provide a measuring device, the indicating parts of which can be readily placed in any position higher or lower than the container to be measured and operated from the position of the indicating parts.

Measuring devices hitherto employed in measuring tanks or liquid containers have to be operated in the vicinity of the tanks themselves or have proven quite unsatisfactory and inaccurate for the purpose. At present practically all gasoline service stations, refinery tanks, etc., are still dependent on the stick method of measurement.

Our invention provides an accurate measuring device which can be installed in any desired operating place connected with any number of tanks to be measured and operated simply and rapidly.

Another object of our invention is to provide a measuring device which is adjustable and can be used to measure liquids of different specific gravities.

Another object of our invention is to provide a measuring device which can be used in connection with a number of different tanks to be measured and which can be easily adjusted to compensate for any differences in construction or connection with the indicating device.

Another object of our invention is to provide a measuring device which is particularly simple and economical in construction.

Another object of our invention is to provide a measuring device which is particularly positive in action and independent of any springs, floats, stretched wires, etc.

The accompanying drawings illustrate diagrammatically an apparatus in which our invention has been successfully embodied:

Figure 1 is an elevation, partially in section, of the apparatus referred to.

Fig. 2 is a vertical section taken on a line indicated by $x^2-x^2$, in Fig. 1.

Fig. 3 is a horizontal section taken on the line indicated by $x^3-x^3$ of Fig. 1.

Fig. 4 is an elevation, partially in section, of a safety device partially shown in Fig. 1.

Fig. 5 is a horizontal section on the line 5—5 of Fig. 1.

Fig. 6 is a section on the line 6—6 of Fig. 1.

Fig. 7 is a section on the line 5—5 of Fig. 1 with the adjusters in a different position; and Fig. 8 is a section on the line 6—6 of Fig. 1 with the adjuster parts in the same position as shown in Fig. 7.

A tube or pipe 1 is immersed in a liquid container 2 in which the quantity or height of the liquid is to be measured. The tube 1 is open at the bottom as indicated at 3. This opening may consist of any number of openings placed around the tube as desired. The tube 1 is connected by a line or pipe 4 through a valve 5 to a gage 6. A number of such valves 5 are shown for connection with different containers to be measured by the same gage (only one such container is shown in the drawings). The gage 6 comprises a chamber 7 which is preferably rectangular or square in cross section and air tight. There is provided a transparent gauge tube 9 and a pipe connection 8 between the lower ends of the chamber and tube. The upper end of the gage tube is provided with a safety device 10. The safety device 10 is vented at the top 27. An adjuster or compensating member 11 is provided in the rectangular chamber 7 and comprises two complementary parts 12 and 13. The two parts 12 and 13 are so constructed that they can be fitted together to form one rectangular block and might be formed by separating such a block along a plane perpendicular to one side and diagonally across it. The part 12 is fastened at its top 15 to a chain 16 which passes over a pulley 17 and is fastened to the part 13 at point 14. The pulley 17 is mounted on the shaft 18 which is connected outside of the chamber 7 to a pointer 19 operating on an indicating dial 20. The shaft 18 is provided with an adjusting knob 21. The gage 6 is partially filled with a liquid to the center of the adjuster 11 and an indicating scale 22 is provided along the gage tube 9 with its zero point at the center of the adjuster. In this adaption of our invention we preferably use a nonvolatile oil which is low in viscosity, as too viscous an oil will cling to the adjuster 11 and not give a rapid reading during the operation. A light mineral oil such as transformer oil or animal oil such as sperm oil, is suitable for this purpose.

In the line 4 between the valves 5 and gage 6 is provided an air inlet 23 connected to a source of compressed air. Any source of air (not shown) such as a compressed air tank, or pump, may be used. Between the air supply and the line 4 are two valves 24 and 25. The valve 24 is set to admit only sufficient air pressure to expel any liquid from the tube 1 into that in the container 2. The valve 24 may be regulated and the supply of air required admitted through the valve 25. A valve 26 may be connected in the line 4 for exhausting air pressure when desired.

The operation of the device is as follows:
The valves 5 are all closed with the exception of the one leading to the container to be measured. The exhaust valve 26 is closed and the air valve 25 is opened. A sufficient air pressure is admitted to the line 4 to expel the liquid from the tube 1 at its opening 3. An air pressure is thereby imparted to the line 4 equal to the pressure exerted by the height of the liquid in the container 2 above the opening 3 in the tube 1. This pressure is transmitted to the gage 6 and the oil forced downward in the chamber 7 and upward in the gage tube 9. The scale 22 may be calibrated to read correctly either the volume or the height of the liquid in the container 2. The oil in the gage 6 will rise to a height in the gage tube 9 proportional to the pressure exerted by the height of the liquid in the container 2 above the opening 3 in the tube 1.

In use, the liquid height in any one of the various containers connected with the respective valves 5 may be determined by opening the valve 5 thereto and closing all the remaining valves 5. In case, however, the containers are filled with liquids of different specific gravity the gage 6 must be compensated for any such differences. This compensation is effected by the adjuster 11. By rotating the adjusting knob 21 connected to the pulley 17 through the shaft 18, the position of the parts 12 and 13 of the adjuster 11 are relatively shifted. These parts 12 and 13 are connected by one chain 16 to each other so that the pulley 17 may lower one part and raise the other equally. The operation of the adjuster 11 then changes the volume of the oil in the column 7 between the two parts 12 and 13 by bringing together or separating these two parts. By thus varying the volume of the liquid between the two parts 12 and 13 the gage may be adjusted to compensate or correct for the specific gravity of the liquid in the container to be measured, and for any structural variations in connections. In use the correct position of the adjuster 11 for any gravity oil may be determined by actual testing and the dial 20 then calibrated to correspond to a Baumé gravity scale. Before operating the measuring device, the dial 20 may then be first set to the proper position as indicated by the gravity of the liquid to be measured. As shown most clearly in Figs. 5 to 8 inclusive, only part of the space of chamber 7 is available for occupation by liquid, the remainder of such space being filled by adjuster parts 12 and 13. With the parts 12 and 13 in any one position, this space (available for occupation by the liquid) is uniform throughout the portion of the chamber 7 in which the adjuster parts 12 and 13 overlap, as indicated by the equal free area of Figures 5 and 6, showing the adjuster parts in one adjusted position, and also the equal available areas shown in Figures 7 and 8, showing the adjusters 12 and 13 in another position. Thus, as termed in the appended claim, the "effective" cross sectional area of the chamber 7 is uniform throughout the length of liquid travel, but such effective cross sectional area may be uniformly varied by shifting the adjuster parts 12 and 13.

When using the device in connection with a number of tanks of different design or widely separated from each other, a number of scales may be required on the dial 20 or scale 22 to correspond with the different tanks. In such case the best method of calibrating and adjusting the device is easily determined by trial at the time the device is installed. It should be noted that the zero point of the oil in the gage 6 will not be changed by the operation of the adjuster 11 since the increased immersion of one of the adjuster parts is exactly balanced by the decreased immersion of the other adjuster part. This is only true when the gage 6 is filled to the center of the adjuster 11 as specified. If, by any chance or accident, the pressure in the line 4 on the gage 6 becomes great enough to force the oil in the column 9 over the top, it is trapped in the safety device 10 and will return to the gage when the air pressure is exhausted.

The particular embodiment of our invention referred to in the drawing in the foregoing description is highly suited to the successful practice of our invention. It is especially to be noted that the described indicating gage 6 might be replaced by any of the well known devices actuated by air pressure. Our invention is not limited to the specific embodiment as described herein but is of the scope set forth in the following claim:

We claim:
In a gage, two liquid containing chambers interconnected at their lower ends, one constituting an indicating chamber, an inlet through which gas may be admitted for forcing the liquid down the other chamber so as to cause the liquid to rise in the indicating chamber, two relatively movable overlapping members disposed in said non-indicating chamber, said members being reversely tapered so as to leave between them throughout their combined length and in each position a channel of uniform cross-sectional area for occupation by liquid in said column and being reversely movable into different positions, in each of which said cross-sectional area for occupation by liquid is different from each other position of the members, and means for so relatively moving the members.

Signed at Los Angeles, California this 13th day of June, 1922.

S Q SHANNON.
HERMAN PAGE RANDALL.